(12) United States Patent
Lorcks et al.

(10) Patent No.: US 6,218,321 B1
(45) Date of Patent: Apr. 17, 2001

(54) BIODEGRADABLE FIBERS MANUFACTURED FROM THERMOPLASTIC STARCH AND TEXTILE PRODUCTS AND OTHER ARTICLES MANUFACTURED FROM SUCH FIBERS

(75) Inventors: Jurgen Lorcks, Rees; Winfried Pommeranz, Enger; Harald Schmidt, Emmerich, all of (DE)

(73) Assignee: Biotec Biologische Naturverpackungen GmbH (DE)

(*) Notice: Subject to any disclaimer, the term of this patent is extended or adjusted under 35 U.S.C. 154(b) by 0 days.

(21) Appl. No.: 08/860,147

(22) PCT Filed: Dec. 20, 1995

(86) PCT No.: PCT/IB95/01142

§ 371 Date: Aug. 25, 1997

§ 102(e) Date: Aug. 25, 1997

(87) PCT Pub. No.: WO96/19599

PCT Pub. Date: Jun. 27, 1996

(30) Foreign Application Priority Data

Dec. 22, 1994 (DE) .................................. 44 46 054
Apr. 7, 1995 (DE) .............................. 195 13 235

(51) Int. Cl.[7] .................................................. B32B 23/04
(52) U.S. Cl. .......................... 442/165; 442/59; 442/295; 442/361; 442/395; 524/47; 523/128; 604/370; 604/372
(58) Field of Search ............................. 442/59, 361, 395, 442/165, 295; 524/47; 523/128; 604/370, 372

(56) References Cited

U.S. PATENT DOCUMENTS

| 5,234,977 | * | 8/1993 | Bastioli et al. | 524/47 |
| 5,275,774 | * | 1/1994 | Bahr et al. | 264/211 |
| 5,295,985 | * | 3/1994 | Romesser et al. | 604/358 |
| 5,516,815 | * | 5/1996 | Buchler et al. | 523/128 |

FOREIGN PATENT DOCUMENTS

| 0541050 | 5/1993 | (EP) . |
| 0542155 | 5/1993 | (EP) . |
| 0596437 | 5/1994 | (EP) . |
| 03027109 | 2/1991 | (JP) . |
| 04146217 | 5/1992 | (JP) . |
| 90/05161 | 5/1990 | (WO) . |
| WO91/12186 | * | 8/1991 | (WO) . |
| 91/16375 | 10/1991 | (WO) . |
| 92/02559 | 2/1992 | (WO) . |
| 92/20740 | 11/1992 | (WO) . |
| 93/07213 | 4/1993 | (WO) . |

* cited by examiner

*Primary Examiner*—Terrel Morris
*Assistant Examiner*—John J. Guarriello
(74) *Attorney, Agent, or Firm*—Workman, Nydegger & Seeley

(57) ABSTRACT

Articles of manufacture which comprise biodegradable fibers and fabrics made therefrom. The fibers are made from starch-based biodegradable thermoplastic polymers, which preferably include a an additional biodegradable thermoplastic polymer blended with thermoplastic starch for improved chemical and physical properties. Threads or fibers for the manufacture of these articles are drawn in a process that improves their mechanical properties, particularly their strength. These threads or fibers can be used in the manufacture of articles that have open, semi-densely packed or densely packed structures.

31 Claims, 3 Drawing Sheets

Diagram 1

BIODEGRADABLE FIBERS MANUFACTURED FROM THERMOPLASTIC STARCH AND TEXTILE PRODUCTS AND OTHER ARTICLES MANUFACTURED FROM SUCH FIBERS

The present invention relates to textile products and packaging materials, the processes for their production and to diverse technical and non-technical uses of the textile products.

Textiles, textile composites, not only in the technical but also in the non-technical field of application, and also packaging materials and the like are fabricated not only from natural raw materials, but also from cellulosic and synthetic raw materials, for example synthetic polymers.

As well as the weighty concern of skin compatibility in connection with clothing textiles and hygiene articles, there is also increasing concern about biodegradability, in order that, especially, single-use or disposable articles may be disposed of safely. Examples of the articles in question are hygiene articles, interlinings, wadding, nets, webs and the like. These products are to some extent based on relatively costly cotton or cellulosic materials, such as wood pulp, viscose, etc., whereas synthetic materials are less in demand because of poor skin compatibility. In addition to the fact that the biodegradability of natural raw materials is normally sufficient, however, there is the negative fact that, in general, the mechanical properties of these materials are not exactly outstanding. The synthetic raw materials which have significantly better mechanical properties, however, do not constitute a solution to the stated problems because of poor skin compatibility and poor degradability.

It is therefore an object of the present invention to provide textile raw materials—for technical and nontechnical use and also for use as packaging materials—which possess good biodegradability, have good skin compatibility if necessary and have at least acceptable mechanical properties.

The prior art discloses for example the production of man-made fibers from which textile raw materials can be fabricated. In the production of these man-made fibers, these are spun directly from a melt or, via various intermediate steps, into threads and then drawn to enhance the strength. In the plastic industry it is further known to orient synthetic, thermoplastic materials. However, all these known synthetic polymer fibers contain significant portions which are not fully biodegradable, especially those constituents which are included to achieve certain properties, such as, especially, mechanical properties.

E-P-A 541 050 proposes producing starch fibers by the melt spinning process, the starch used including inter alia modified and/or unmodified starch. Modified starch is understood to be, destructured starch and also, on the other hand, chemically modified starch. These starch components are mixed with a number of further polymer components and processed into fibers. Fibers produced from destructured starch are unsuitable for the production of textile products, since they have poor mechanical properties, and chemically modified starch as fiber material generally results in inadequate biodegradability.

It is therefore a further object of the present invention to provide raw materials - such as, in particular, threads, fibers, monofils and the like for the production of textile raw materials - which possess good biodegradability, have good skin compatibility if necessary and have at least acceptable mechanical properties.

This invention proposes textile products both for technical and non-technical use and also packaging materials as per the wording of claim 1.

It further proposes a process for producing high strength threads, fibers and also monofils and the like as per the wording of claim 9 especially.

What is proposed is that textile products both for technical and non-technical use, packaging materials and also the necessary starting materials such as threads, fibers, monofils, webs, waddings, wovens, nets and the like contain at least one polymer blend containing thermoplastically processible starch.

WO90/05161 discloses producing thermoplastically processible starch, or thermoplastic starch for short, from native starch with the aid of a plastificating material. What is essential here is that the destructuring and plastification of the native starch take place very substantially in the absence of water; that is, that, in the production of thermoplastic starch, the water content be distinctly below 5% by weight, preferably below 1–2% by weight, based on the weight of the starch/plastificator mixture. Suitable plastificators are, especially, glycerol and sorbitol, but it is also possible to use other additives which have a solubility parameter which is within the range of the solubility parameter of starch. It is further proposed to admix the thermoplastic starch with gelatin, protein, polysaccharide, cellulose derivative, a synthetic polymer and/or gelatin phthalate as fillers. The thermoplastically processible starch is suitable, inter alia for producing fibers, films or networks.

Since the production of thermoplastic starch is extensively described in said cited WO90/05161, a repetition of this prior art will be dispensed with here.

However, to produce the textile products, packaging materials and their starting raw materials claimed according to the invention it is possible to use not only pure thermoplastic starch but also polymer blends which, as well as thermoplastic starch, contain at least one of the following components:

a polyolefin and also a block copolymer as compatibilizer, a polyolefin and also an ethylene acrylate maleic anhydride copolymer, a cellulose derivative, such as a cellulose ether, a cellulose ester or a cellulose acetate butyrate mixed ester, a hydrophobic biodegradable polymer such as an aliphatic polyester, a hydrophobic protein or polyvinyl alcohol, an aromatic polyester and/or a polyester copolymer produced from customary diols and from aromatic and aliphatic dicarboxylic acids, a polyesteramide.

In connection with polymer blends directed to thermoplastic starch, polyolefins and a block copolymer as compatibilizer, reference is made to WO91/16375.

In connection with the polymer blend based on thermoplastic starch, a polyolefin and also an ethylene acrylate maleic anhydride copolymer, reference is made to WO92/20740.

Polymer blends consisting of thermoplastic starch and a cellulose derivative are extensively described in EP-A-542 155.

Polymer blends again based on thermoplastic starch and a biodegradable hydrophobic polymer are extensively described in EP-A-596 437.

The solution provided by the invention is based on the basic concept of producing raw materials, such as threads or high strength threads, fibers, monofils, staples and the like, from an extrudate of a thermoplastically processible starch and/or optionally a biodegradable polymer blend based on thermoplastic starch. The resulting raw material according to the invention is thus fully biodegradable.

The combination of thermoplastic starch with other preferably polymeric components has the purpose of further improving the relatively good inherent mechanical properties of thermoplastic starch and adapting them to the intended use, if necessary. Especially the combination of thermoplastic starch with the abovementioned other, preferably polymeric, blending partners has the purpose of further optimizing the inherently favorable properties of thermoplastic starch to the intended use. For instance, it is especially polymer blends consisting of thermoplastic starch and aliphatic and also aromatic polyesters, polyesterurethanes and the like which have been found to be particularly suitable. Occasionally, the blending partners will be polymers which do not biodegrade of themselves, for example aromatic polyesters, but which in combination with other blending partners, for example aliphatic polyesters and the thermoplastic starch, can be biodegraded none the less.

Especially polycaprolactone, polyhydroxybutyric acid, polylactic acid, polyhydroxybenzoic acid, polyhydroxybutyric acid/hydroxyvaleric acid copolymer and the like have been found to be particularly favorable blending partners for thermoplastic starch. A special mention must also go to aliphatic polyesters based on aliphatic dicarboxylic acids and aliphatic diols, for example homopolymers or copolymers of polybutylene succinate adipate and polyethylene succinate adipate. Further blending partners for thermoplastic starch for the production of the textile raw materials and textile products defined according to the invention are the following materials:

gelatin, protein, zein, polysaccharides, cellulose derivatives, polylactides, polyvinyl alcohol, polyvinyl acetate, polyacrylate, sugar alcohol, shellac, casein, polyacetal, polyesterurethane, copolyesters of aliphatic diols and aromatic dicarboxylic acids, fatty acid derivatives, lecithin, chitosan, polyesteramide.

It is further possible to add natural fibers, for example cotton, wool, sisal, ramie, linen or flax to the starting materials for the production of the textile raw materials and products defined according to the invention.

It is possible, of course, to admix the starting material with still further additives or aggregates as is generally customary in the production of fibers, monofils, threads and the like.

Examples of possible and preferred polymer blends which are suitable for the production of fibers, monofils, threads, films and the like for technical and non-technical textile products and also for packaging materials are recited in the below-presented table 1. The seven recited examples include not only the components which are used for producing the thermoplastic starch but also the possible blending partners for thermoplastic starch for the production of the polymer blends proposed according to the invention. The table additionally contains the processing conditions and especially the water content prevailing in the extruder during the production of the polymer blends, this water content being throughout less than 0.1% by weight. Finally, the table recites preferred application possibilities for the exemplified polymer blends. Of course, the table only contains examples, and all the components mentioned at the beginning are suitable for blending with thermoplastic starch for producing starting materials for technical, non-technical textile products and also packaging materials.

TABLE 1

| | Examples | | | | | | |
|---|---|---|---|---|---|---|---|
| Example | 1 | 2 | 3 | 4 | 5 | 6 | 7 |
| [1]starch % | 38.2 | 24.6 | 29.2 | 24.6 | 30.7 | 28.0 | 21.5 |
| [1]Sorbitol % | 12.8 | 8.2 | 9.4 | 8.8 | 9.1 | 8.8 | 6.9 |
| [1]Glycerol % | 8.5 | 6.0 | 6.2 | 6.0 | 7.4 | 6.2 | 4.1 |
| [2]TPS % | 54.5 | 35.5 | 41.1 | 36.0 | 43.5 | 39.5 | 29.7 |
| $H_2O$ % | <0.1 | <0.1 | <0.1 | <0.1 | <0.1 | <0.1 | <0.1 |
| [3]PLA % | — | — | — | — | 48.8 | 55.0 | — |
| [4]Polyamide 1 | 40.5 | 61.2 | — | — | — | — | 67.5 |
| [5]Polyester 1 | — | — | 55.2 | 60.6 | — | — | — |
| [6]PCL % | — | — | — | — | 4.0 | 2.0 | — |
| $H_2O$ % | <0.1 | <0.1 | <0.1 | <0.1 | <0.1 | <0.1 | <0.1 |
| [7]Extrusion | ZSK 40 | ZSK 40 | ZSK 40 | ZSK 40 | ZSK 40 | ZSK 40 | ZSK 40 |
| T ° C. | 220 | 206 | 203 | 210 | 215 | 210 | 220 |
| Pressure bar | 6.5 | 2.5 | 1.5 | 1.5 | 6.2 | 7.5 | 0.5 |
| MFI g/10 | 9 | 13 | 12.5 | 13 | 8.5 | 8.0 | 22 |
| Granulate | 4 mm | 4 mm | 4 mm | 4 mm | 4 mm | 4 mm | 4 mm |
| Gra $H_2O$ % | 3.5 | 3.6 | 3.4 | 3.6 | 3.4 | 3.4 | 3.0 |
| Application | | | | | | | |
| Blown film | + | + | + | + | + | + | − |
| Flat film | + | + | + | + | + | + | − |
| Sheets | + | + | + | + | + | + | − |
| Injection molding | + | − | + | − | + | − | − |
| Fibers | − | + | − | + | − | + | + |

[1]Starch = native potato starch dried 3.5% of $H_2O$, Sorbitol = Sorbitol LG DHR 71%, Glycerol 99.5% strength;
[2]TPS = thermoplastic starch = starch + sorbitol + glycerol <0.1% of $H_2O$, water content by devolatilization. According to the known process EP 0 397 819 anhydrous TPS consists of starch, sorbitol and glycerol;
[3]PLA (polylactic acid resin) = Mitsui Toatsu Chemicals LACEA H 100 MFR 13 190° C. 2.16 kg;
[4]Polyamide 1 = Baer BAK 1095 polyesteramide MFI 2.5 150° C. 2.16 kg;

TABLE 1-continued

| | Examples | | | | | | |
|---|---|---|---|---|---|---|---|
| Example | 1 | 2 | 3 | 4 | 5 | 6 | 7 |

[5]Polyester 1 = BASF ZK 242/108 copolyester from aliphatic diols and aliphatic/aromatic dicarboxylic acids MVR 3.0 at 190° C./2.16 kg;
[6]PCL (polycaprolactone) = Union Carbide Tone Polymer P-787 MFI 1.0 125° C. 44 psi g/10 min;
[7]Extrusion equipment = Werner & Pfleiderer ZSK 40

In what follows, the production of the raw material defined according to the invention, for example of a high strength thread or of fibers suitable for the production of textile products, is more particularly described by way of example.

The starting materials modified in an extruder are extruded as film and cut into threads or directly extruded as threads, drawn to increase their strength and then wound up or directly further processed in-line to wovens or the like. The optimum processing temperatures for the threads of the invention, especially during the drawing step, range from about 30 to 40° C., and so are significantly lower than those of synthetic thermoplastic materials whose processing temperature is customarily 100° C. During drawing at about 30 to 40° C., the macromolecules acquire an orientation which is effective in bringing about an increase in the breaking strength, an increase in the transparency and an increase in the stability to reaction of water and water vapor. Surprisingly, this treatment has the effect of increasing the maximum breaking strength of the thread by approximately a power of ten compared with an unstretched thread having the same cross section.

Figure 1:
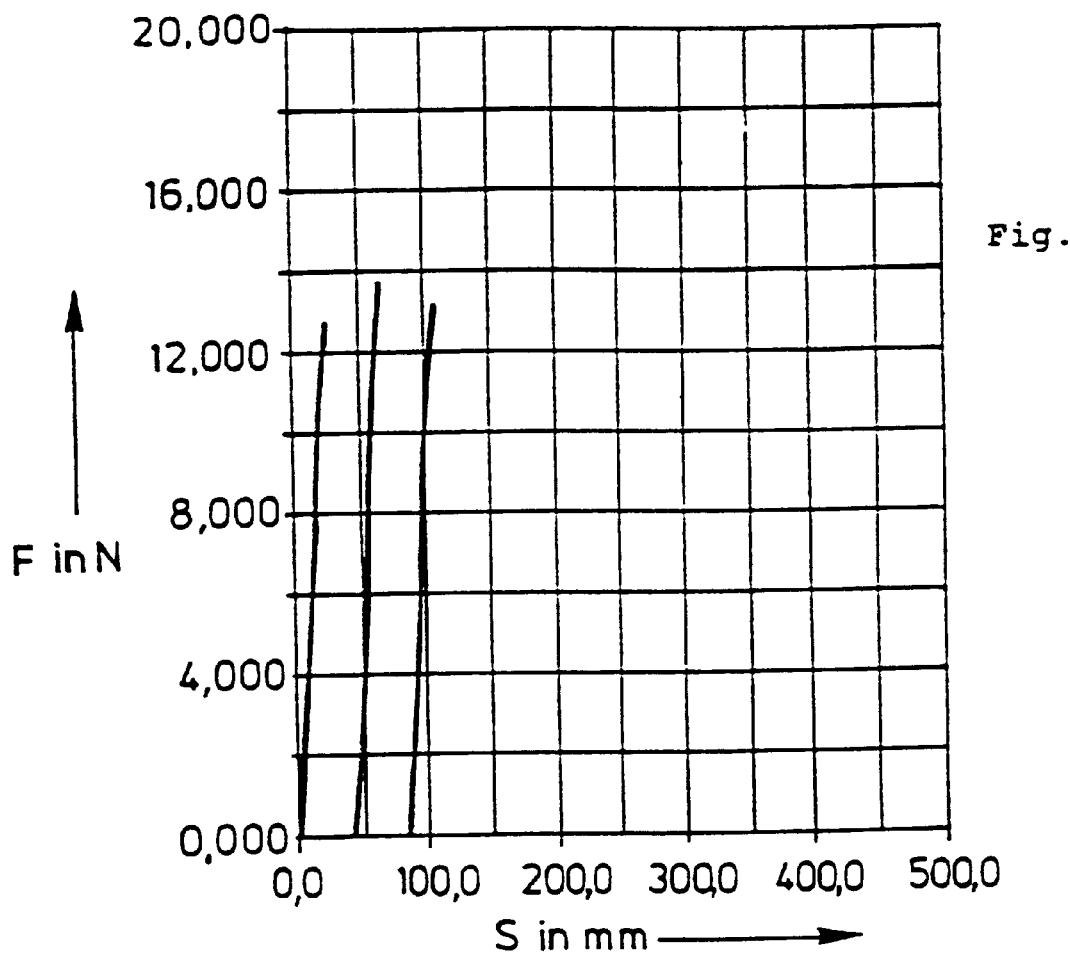
FIG. 1 is a graph depicting the results of a tensile test of a tensile test for blends according to the present invention.

The extruder-modified mixture of the starting materials composed of thermoplastically processible starch or a biodegradable polymer blend based on a thermoplastic starch can initially be processed into a film as described for example in DE-B-42 28 016 and then be cut into threads and drawn, or directly extruded as single threads in an in-line process via a multihole die and then be drawn directly. The drawing of the threads is effected monoaxially at room temperature or at temperatures up to not more than 60° C., but preferably at 30 to 40° C. in air or in some other medium, for example in a drawing bath of water and/or solvent or else in some other gaseous medium. The draw or orientation ratio is essentially between 1:5 and 1:20, preferably 1:8. If the starting material mixture is extruded as a film, there are the following possibilities for further processing: directly below a film extruder (blown or flat film) the film is continuously cut in-line into individual threads, the resulting threads are then drawn in-line according to the above process parameters and wound up individually on bobbins as breaking-resistant ribbons. The resulting biodegradable ribbons can be directly used in ribbon form or else be further processed in a single stage on a further machine starting from the wound individual bobbins to form wovens, nets, textiles or ropes. In addition, the individual bobbins formed can be used in a two-stage process to produce said wovens, nets, textiles or ropes via the intermediate step of beaming.

Furthermore, the film starting material as roll material can be cut in one operation into threads, these be drawn in-line according to the above process parameters and beamed up together. The resulting warp beams consisting of a multiplicity of breaking-resistant individual threads can then be further processed in a further operation to form wovens, nets, textiles or ropes.

Similarly, a film which has been monoaxially oriented according to the above process parameters can be used as a starting material (as roll material). This film is cut on a machine in one operation into individual breaking-resistant threads and processed to wovens, nets, textiles or ropes or individually wound up as ribbons.

According to a further processing possibility, the film starting material in roll form is cut in one operation into threads, which are drawn according to the above process parameters and then processed in-line on the same machine into wovens, nets, textiles or ropes or individually wound up as ribbons.

The advantageous properties of the threads of the invention will now be illustrated with film tensile tests which have been carried out. A film strip produced from a biodegradable material composed of a thermoplastic starch and a degradable aliphatic polyester (BIOFLEX BF 102) having length/width/thickness dimensions of 50 mm/2 mm/0.025 mm was drawn at a temperature of 35° C. to a ratio of 1:8. During several tensile tests, it was found out that the breaking or tensile strength of this film strip amounts to between 216 and 250 N per mm$^2$ under an applied breaking force of 12.8 to 14.8 N. By contrast, the breaking strength of an undrawn film strip tested for comparison is only about 25.1 to 38.1 N per mm$^2$ under a breaking force of 1.3 to 1.9 N. The following conducted film tensile tests I and 2 illustrate these results with the related diagrams 1 and 2 (FIGS. 1 and 2) for drawn threads, where h is the specimen thickness, $A_0$ the specimen cross-sectional area, $F_{max}$ the maximum breaking force of the specimen strip, $\delta_{max}$ the maximum breaking strength based on the specimen's cross-sectional area, S-($F_{max}$) is the extension of the specimen in mm and $\epsilon$-($F_{max}$) is the extension in % of the original measured length. Comparative experiment 3 illustrates in diagram 3 (FIG. 3) the results of tensile testing undrawn threads, additional variables determined being the tensile force at which the extension begins ($F_{extension}$) and the yield stress acting at the time.

First film tensile test with drawn film (FIG. 1).
Experimental parameters:

| | | |
|---|---|---|
| Sample width | = 2 mm | |
| Measured length | = 50 mm | (corresponds to distance between pressure plates) |
| Preforce at start of measurement | = 0.2 N | |

-continued

| | |
|---|---|
| Rupture criterion | = 2 N |
| Rate to preforce | = 500 mm/min |
| Test rate | = 500 mm/min |

All three specimens were drawn in a ratio of 1:8 at a temperature of 35° C.

Experimental results

| No. | h mm | $A_0$ mm² | $F_{max}$ N | $\delta_{max}$ N/mm² | $S$-$(F_{max})$ mm | $\epsilon$-$(F_{max})$ % |
|---|---|---|---|---|---|---|
| 1 | 0.027 | 0.054 | 12.765 | 236.389 | 26.20 | 52.39 |
| 2 | 0.028 | 0.056 | 13.748 | 245,500 | 25.74 | 50.88 |
| 3 | 0.030 | 0.060 | 13.027 | 217.117 | 27.75 | 55.50 |

Figure 2:
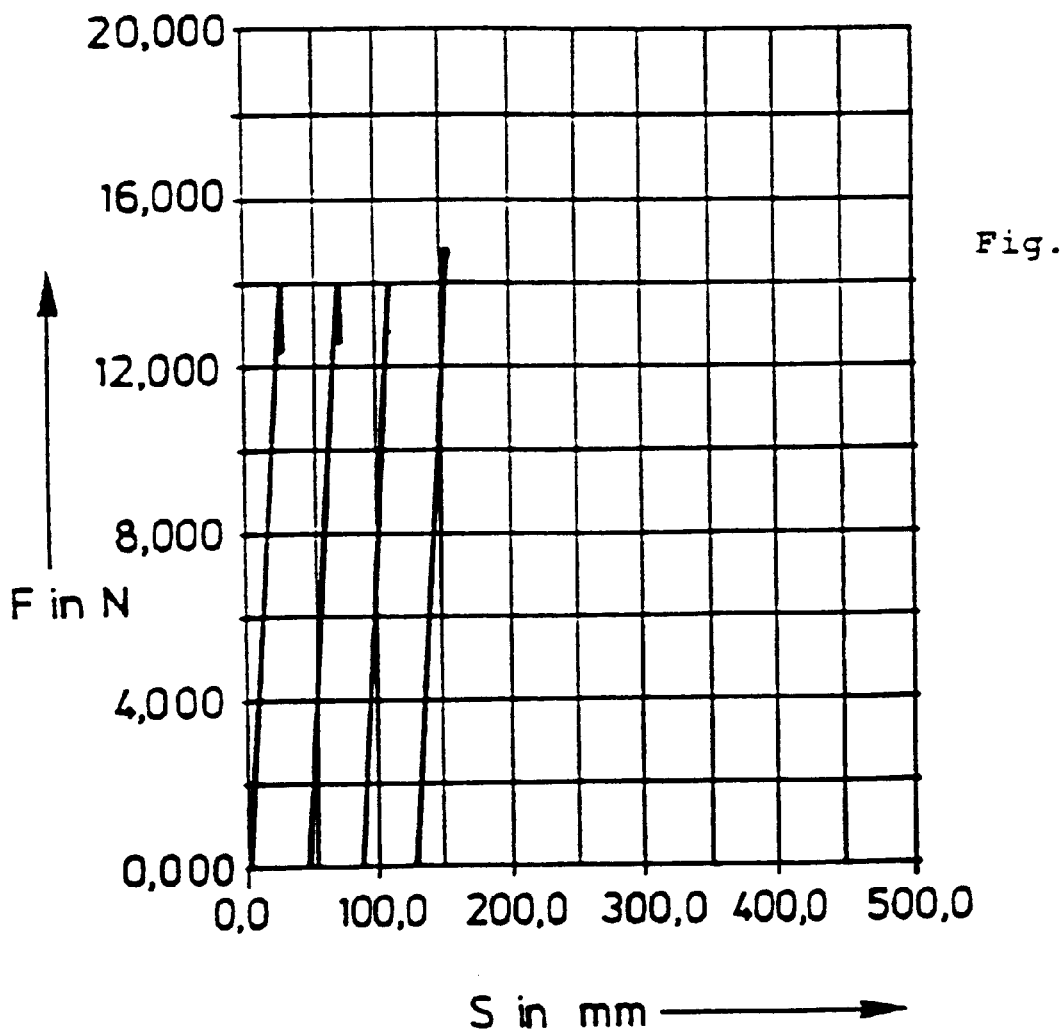
FIG. 2 is a graph depicting the results of a tensile test for blends according to the prevention.

Second film tensile test with drawn film (FIG. 2).
Experimental parameters:
The experimental parameters correspond to those of the 1st film tensile test.

Experimental results

| No. | h mm | $A_0$ mm² | $F_{max}$ N | $\delta_{max}$ N/mm² | $S$-$(F_{max})$ mm | $\epsilon$-$(F_{max})$ % |
|---|---|---|---|---|---|---|
| 1 | 0.028 | 0.056 | 13.893 | 248.089 | 26.51 | 52.49 |
| 2 | 0.032 | 0.064 | 13.866 | 216.656 | 27.74 | 55.00 |
| 3 | 0.028 | 0.056 | 14.015 | 250.268 | 26.24 | 51.87 |
| 4 | 0.031 | 0.062 | 14.760 | 238.065 | 26.67 | 53.33 |

Figure 3:
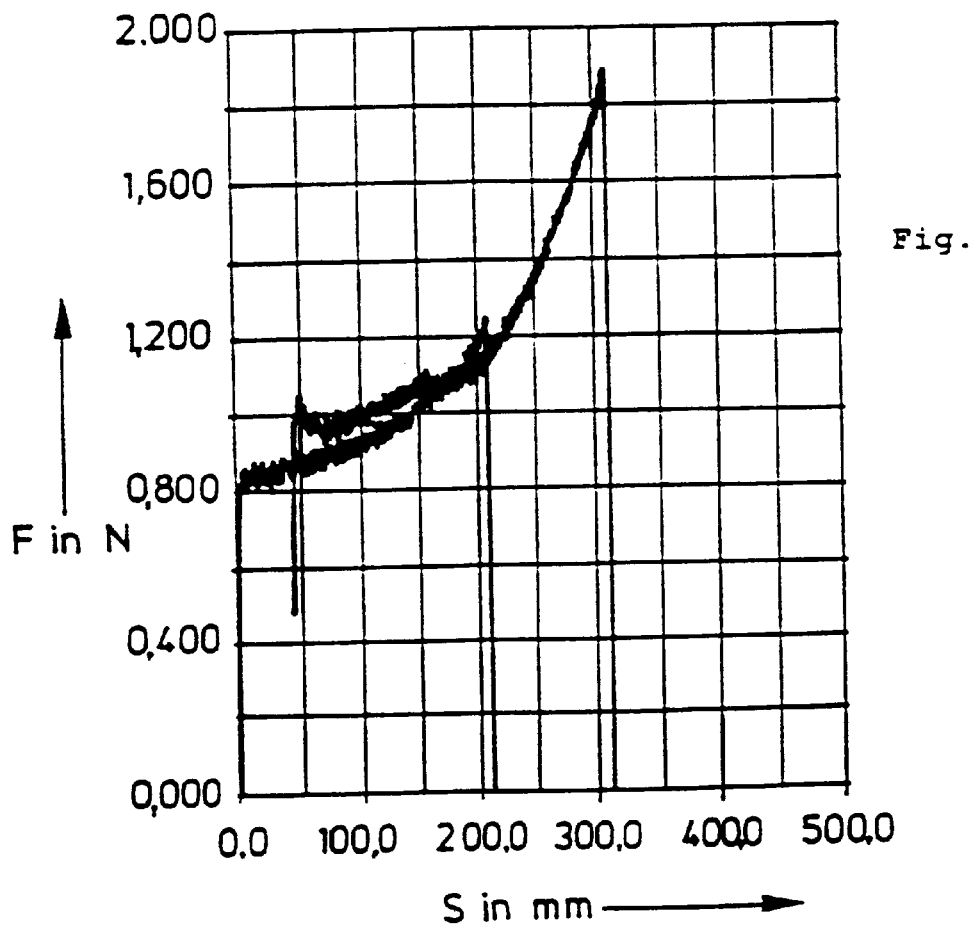
FIG. 3 is a graph depicting the results of a comparative tensile test for undrawn threads.

Third film tensile test with undrawn film (FIG. 3).
Experimental parameters:
The experimental parameters correspond to those of the 1st film tensile test.

Experimental results

| No. | Ident-22 Comment | h mm | $A_0$ mm² | $F_{max}$ N | $\delta_{max}$ N/mm² |
|---|---|---|---|---|---|
| 1 | Longitudinal extension | 0.025 | 0.050 | 1.257 | 25.14 |
| 2 | Longitudinal extension | 0.025 | 0.050 | 1.906 | 38.120 |

| No. | $S$-$(F_{max})$ mm | $\epsilon$-$(F_{max})$ % | $F_{extension}$ N | Yield stress N/mm² |
|---|---|---|---|---|
| 1 | 209.58 | 419.17 | 0.85 | 17 |
| 2 | 267.92 | 535.84 | 1.05 | 21 |

As the experiments show, the fibers and threads of the invention can be processed with the aid of a drawing process otherwise customary in the production of man-made fibers. The drawing of the threads is very effective even at just 35° C., and improves the breaking strength considerably. Furthermore, the entire production of the threads including the drawing can take place in a continuous, single-stage process. The novel threads and fibers composed of fully biodegradable materials are suitable, for example, when produced as ribbons and/or monofils as end product for applications in agriculture and horticulture (plant ribbons or the like), as packaging material (packaging twines and tapes or the like) or as intermediate product on warp beams or individual bobbins for further processing to fully biodegradable nets, wovens, textiles or ropes. Furthermore, particularly strong, fully biodegradable fibers and/or ropes can be produced by twisting or braiding the ribbons/monofils. These particularly strong tapes and/or ropes can be further processed into nets, wovens and textiles of any kind.

Applications for products of this type are for example:

packaging sacks (Raschel or netting sacks etc.) with open or semidense or dense structures for, for example, potatoes, citrus fruits, onions, etc., toys, household goods and other products of any kind, lightweight protective fencings for trees or plants of any kind in afforestations/replantings in the forestry sector or horticulture, for example against game damage or as erosion protection, for fly nets for doors and windows or mosquito nets, tree packaging (for example Christmas trees etc.) and nets for root balls in horticulture and agriculture, tear-resistant refuse sacks, filter fabrics of any kind, weldable banderolations in the form of tear banderoles, hoop banderoles or the like, nets in the sports sector (badminton, tabletennis, volleyball or the like), lattice fabrics for pets, for example rabbitries, pigeonries, etc., protective nets of any kind, for example for personnel protection, rockfall protection, erosion protection, including in viticulture, in agriculture and in horticulture, net roll material for building material stores etc. (home worker supplies), products for fish farming and seawater/freshwater fishery, textiles of any kind, for example tablecloths, wind protection, sun protection, tarpaulins, awnings, etc., agrotextiles, for example soil mulches for harvest advancement, wind and sun protection, fibers in the form of air layed paper, thermobonded nonwovens, textile packaging tape, for example for carton hooping, palette hooping, etc., protective clothing or disposable clothing in clean rooms, for example hoods, gloves, booties, overalls and coats.

A further example of an application for the threads of the invention in the textile sector is their processing into diaper products. Such a fully biodegradable diaper can be constructed as follows.

The outer shell is formed by a biodegradable film as described for example in DE-B-42 28 016, which is laminated onto a soft layer of pulp. Further soft layers of pulp which contain SAP products (superabsorbents as starch graft polymers) and are adjusted to be highly water-absorbent are introduced. The inner core consists of a web of biodegradable material. The diaper in the aforementioned construction can be produced at a high rate of production since the preliminary products are present as roll material and the individual layers are brought together by sealing operations. By stamping, for example, the diaper shape and size is produced from the roll material. The edges and the rubber threads are secured to the elastic leg and stomach border by heat sealing. Contact adhesive strips or touch-and-close fasteners are used to secure the front part of the diaper to the back part.

The threads and fibers of the invention can also be produced themselves as loose materials such as staple fibers or filament fibers and be processed into nonwovens, felts and textile composites. The fiber webs are consolidated by needling, interlooping, entangling, melting or sealing of the fibers. The webs can also be strengthened by additional threads, wovens or nets, for example similar or different degradable materials, for example cellulose fibers, vegetable fibers composed of cotton, kapok, sisal, flax, hemp, jute, kenaf, ramie, coir and fibers composed of wool or silk. These aforementioned webs, felts and textile composites can be used for producing filters, artificial leather, disposable articles such as dusters, wipes, diapers, as insulating material for technical or made-up textiles, for example protective clothing.

Further textiles, textile semi- and end-fabricates and finished goods produced therefrom are for example linear structures such as yarns, lines, strings, laces, ropes, thread; sheetlike structures such as adhesive goods, felts, needlefelts, knitted materials or lofty structures such as staples, waddings, filter mats and polishing waddings.

What is claimed is:

1. A fibrous article of manufacture comprising at least one fiber manufactured from a thermoplastic polymer blend including thermoplastic starch and at least one additional polymer other than starch, wherein the fiber manufactured from the thermoplastic polymer blend has been drawn at a temperature below the melting point of the thermoplastic polymer blend so as to increase the breaking strength of the drawn fiber compared to the breaking strength of the fiber prior to being drawn.

2. A fibrous article of manufacture as defined in claim 1, wherein the thermoplastic starch is manufactured by melting starch in the presence of at least one plasticizer.

3. A fibrous article of manufacture as defined in claim 2, wherein the thermoplastic starch is manufactured from native starch that has been predried to remove at least a portion of the natural water content of the native starch prior to melting in the presence of the plasticizer.

4. A fibrous article of manufacture as defined in claim 2, wherein the thermoplastic starch has a water content of less than about 5% by weight based on the combined weight of starch, plasticizer and water.

5. A fibrous article of manufacture as defined in claim 1, wherein the thermoplastic polymer blend has a water content of less than about 0.1% by weight of the polymer blend during processing.

6. A fibrous article of manufacture as defined in claim 1, further including natural fibers combined with the thermoplastic polymer blend.

7. A fibrous article of manufacture as defined in claim 6, wherein the natural fibers include fibers derived from at least one of cotton, kapok, wool, sisal, jute, kenaf, coir, wool, silk, ramie, flax, or linen.

8. A fibrous article of manufacture as defined in claim 1, wherein the fibrous article is a layered textile product comprising (i) at least one layer that includes the at least one fiber manufactured from the thermoplastic polymer blend and (ii) at least one additional fibrous layer including cellulose fibers.

9. A fibrous article of manufacture as defined in claim 1, wherein the at least one additional polymer is selected from the group consisting of polyolefins, block copolymers of starch and at least one additional polymer, ethylene-acrylate-maleic anhydride copolymers, hydrophobic biodegradable polymers, aliphatic polyesters, aromatic polyesters, aliphatic-aromatic polyester copolymers, hydrophobic proteins, polylactides, cellulose esters, cellulosic ethers, shellac, casein, zein, gelatin, lecithin, chitosan, xanthan gum, guar gum, polyesteramides, polysaccharides, polyacrylates, polyglyconic acid, polylactic acid, polyhydroxybenzoic acid, polyesterurethanes, polycaprolactone, polyhydroxybutyric acid, polyhydroxybutyric-hydroxyvaleric acid copolymer, and mixtures thereof.

10. A fibrous article of manufacture as defined in claim 1, wherein the fibrous article is at least one of a fiber, a thread, a web, a wadding, a woven, a knit, a net, or a felt.

11. A fibrous article of manufacture as defined in claim 1, wherein the fiber manufactured from the thermoplastic polymer blend has been drawn at a temperature of less than about 60° C. and in a manner so as to have a draw ratio in a range from about 1:4 to about 1:20.

12. An article of manufacture comprising a textile product, said textile product including:
at least one fiber fiber manufactured from a thermoplastic polymer blend that includes thermoplastic starch and at least one additional polymer other than starch, wherein the fiber manufactured from the thermoplastic polymer blend has been drawn at a temperature below the melting point of the thermoplastic polymer blend so as to increase the breaking strength of the drawn fiber compared to the breaking strength of the fiber prior to being drawn; and
at least one naturally occurring fiber.

13. An article of manufacture as defined in claim 12, wherein the thermoplastic polymer blend including thermoplastic starch and the additional polymer has a water content of less than about 1% by weight during processing.

14. An article of manufacture as defined in claim 13, wherein the at least one additional polymer is selected from the group consisting of polyolefins, block copolymers of starch and at least one additional polymer, ethylene-acrylate-maleic anhydride copolymer hydrophobic biodegradable polymers, aliphatic polyesters, aromatic polyesters, aliphatic-aromatic polyester copolymers, hydrophobic proteins, polylactides, polyvinyl alcohol, polylactides, polyvinyl acetate, cellulose derivatives, shellac, casein, zein, gelatin, lecithin, chitosan, xanthan gum, polyesteramides, polysaccharides, polyacrylates, polyesterurethanes, and mixtures thereof.

15. A fibrous article of manufacture as defined in claim 14, wherein the fiber manufactured from the thermoplastic polymer blend has been drawn at a temperature below the melting point of the thermoplastic polymer blend so as to increase the breaking strength of the drawn fibers compared to the breaking strength of the fibers prior to being drawn.

16. A fibrous article of manufacture as defined in claim 15, wherein the fiber manufactured from the thermoplastic polymer blend has been drawn at a temperature of less than about 60° C. and in a manner so as to have a draw ratio in a range from about 1:4 to about 1:20.

17. An article of manufacture as defined in claim 12, wherein the thermoplastic polymer blend further includes at least on additive selected from the group consisting of a natural dye, a hydrophobicizer, an emulsifier, guar gum, a cross-linker, a filler, a swelling or plastifying agent, and mixtures thereof.

18. A fibrous article of manufacture comprising at least one fiber manufactured from a thermoplastic polymer blend that includes thermoplastic starch and at least one additional polymer other than starch and which includes less than a 1% water by weight during processing, wherein the fiber manufactured from the thermoplastic polymer blend has been drawn at a temperature below the melting point of the thermoplastic polymer blend so as to increase the breaking strength of the drawn fiber compared to the breaking strength of the fiber prior to being drawn.

19. A fibrous article of manufacture as defined in claim wherein the thermoplastic starch is formed by melting native starch in the presence of at least one plasticizer.

20. A fibrous article of manufacture as defined in claim 19, wherein the native starch has been pre-dried to remove at least a portion of the natural water content of the native starch prior to melting in the presence of the at least one plasticizer to form the thermoplastic starch.

21. A fibrous article of manufacture as defined in claim 19, wherein the at least one plasticizer is selected from the group consisting of glycerin, sorbitol, other sugar alcohols, and mixtures thereof.

22. A fibrous article of manufacture as defined in claim 18, wherein the thermoplastic polymer blend includes less than about 0.1% water by weight during processing.

23. A fibrous article of manufacture as defined in claim 18, wherein the thermoplastic polymer blend further includes at least one additive selected from the group consisting of a natural dye, a hydrophobicizer, an emulsifier, guar gum, a crosslinker, a filler, a swelling or plastifying agent, and mixtures thereof.

24. A fibrous article of manufacture as defined in claim 18, wherein the fiber manufactured from the thermoplastic polymer blend has been drawn at a temperature below the melting point of the thermoplastic polymer blend so as to increase the breaking strength of the drawn fiber compared to the breaking strength of the fiber prior to being drawn.

25. A fibrous article of manufacture as defined in claim 24, wherein the fiber manufactured from the thermoplastic polymer blend has been drawn at a temperature of less than about 60° C. and in a manner so as to have a draw ratio in a range from about 1:4 to about 1:20.

26. A method for manufacturing a fibrous article, comprising the steps of:
  extruding a thermoplastic polymer blend comprising thermoplastic starch and at least one additional polymer to form at least one thread;
  drawing the at least one thread at a temperature less than the melting point of the thermoplastic polymer blend so as to increase the breaking strength of the drawn thread compared to the breaking strength of the thread prior to being drawn; and
  processing one or more of the drawn threads into a desired fibrous article.

27. A method for manufacturing a fibrous article as defined in claim 26, wherein the drawing step is performed at a temperature in a range from about 30° C. to about 40° C.

28. A method for manufacturing a fibrous article as defined in claim 27, wherein the drawing of the at least one thread is effected monoaxially.

29. A method for manufacturing a fibrous article as defined in claim 26, wherein the processing step includes winding one or more of the drawn threads.

30. A method for manufacturing a fibrous article as defined in claim 26, wherein the processing step includes forming one or more of the drawn threads into woven nonwoven, or knitted articles of manufacture.

31. A method for manufacturing a fibrous article as defined in claim 26, wherein the extruding step includes first extruding the thermoplastic polymer blend into a film and then cutting the film into a plurality of threads.

* * * * *

UNITED STATES PATENT AND TRADEMARK OFFICE
CERTIFICATE OF CORRECTION

PATENT NO. : 6,218,321 B1
DATED : April 17, 2001
INVENTOR(S) : Jurgen Lorcks, Winfried Pommeranz and Harald Schmidt It is certified that error appears in the above-identified patent and that said Letters Patent is hereby corrected as shown below:

Column 1,
Line 42, after "industry" insert -- , --
Line 48, change "E-P-A" to -- EP-A --

Column 2,
Line 32, after "invention" insert -- , --

Column 5,
Line 37, change "prevention" to -- present invention --
Line 55, after "film)" insert -- , --
Line 67, after "these" insert -- can --

Column 6,
Line 45, after "tests" change "I" to -- 1 --

Column 7,
Lines 14 and 28, change "S-(F$_{max)}$" to -- S-(F$_{max}$) --
Line 17, change "245,500" to -- 245.500 --

Column 8,
Line 6, after "are" insert -- , --

Column 9,
Line 51, after "coir," delete -- wool, --

UNITED STATES PATENT AND TRADEMARK OFFICE
CERTIFICATE OF CORRECTION

PATENT NO.   : 6,218,321 B1
DATED        : April 17, 2001
INVENTOR(S)  : Jurgen Lorcks, Winfried Pommeranz and Harald Schmidt It is certified that error appears in the above-identified patent and that said Letters Patent is hereby corrected as shown below:

Column 10,
Line 33, after "anhydride" change "copolymer" to -- copolymers, --
Line 61, after "than" change "a" to -- about --

Column 11,
Line 1, after "claim" insert -- 18, --

Signed and Sealed this

Twenty-third Day of April, 2002

Attest:

JAMES E. ROGAN
Attesting Officer    Director of the United States Patent and Trademark Office